(12) United States Patent
Staszewski

(10) Patent No.: US 6,243,729 B1
(45) Date of Patent: Jun. 5, 2001

(54) DIGITAL FINITE-IMPULSE-RESPONSE (FIR) FILTER WITH A MODIFIED ARCHITECTURE BASED ON HIGH ORDER RADIX-N NUMBERING

(75) Inventor: Robert B. Staszewski, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/224,364

(22) Filed: Dec. 31, 1998

(51) Int. Cl.$^7$ .................................................. G06F 17/10
(52) U.S. Cl. ............................................. 708/319; 708/300
(58) Field of Search .......................... 708/319, 300–301, 708/620, 625

(56) References Cited

U.S. PATENT DOCUMENTS

| | | | | |
|---|---|---|---|---|
| 4,573,136 | * | 2/1986 | Rossiter | 708/625 |
| 4,709,343 | * | 11/1987 | Van Cang | 708/319 |
| 5,117,385 | * | 5/1992 | Gee | 708/319 |
| 5,563,816 | * | 10/1996 | Golla et al. | 708/319 |

* cited by examiner

Primary Examiner—Tan V. Mai
(74) Attorney, Agent, or Firm—W. Daniel Swayze, Jr.; Wade James Brady, III; Frederick J. Telecky, Jr.

(57) ABSTRACT

A fast FIR filter 100, a system, and a method that increases the operating speed of a filter. The system uses a high order numbering system, in particular Radix-8, and appropriate control lines, parallel data buses 101 and simple circuits for coefficient pre-multiplying. In a typical application, incoming high-speed unequalized 6-bit data are encoded into the high order numbering system, and placed on two data buses 101, one containing the high order data bit stream, e.g., 4 bits for Radix-8, and the other the low order data bit stream, e.g., 3 bits for Radix-8. The data are further encoded in "hot-one" mode so that at all times exactly one bit is asserted. FIR coefficients are calculated, requiring pre-multiplication for only four non-trivial cases in the case of Radix-8 encoding: C, −C, 3C, and −3C, where C is a coefficient value. Because the coefficients do not change at high data rates, high-speed operation of pre-multiplication is not required. Further, by using the "hot-one" property incorporated in each bus, a simple low-propagational delay passgate multiplexer can be used for pre-multiplying.

22 Claims, 2 Drawing Sheets

DIGITAL FINITE-IMPULSE-RESPONSE (FIR) FILTER WITH A MODIFIED ARCHITECTURE BASED ON HIGH ORDER RADIX-N NUMBERING

FIELD OF THE INVENTION

The present invention relates to a system and method for increasing the operating speed of a finite-impulse-response (FIR) filter by taking full advantage of the Radix-N numbering system as implemented in a modified architecture, where N>4. The modified architecture relates particularly to applications having unequalized input data of an n-bit binary format, where n is >2.

BACKGROUND

A FIR filter may be included in the general class of devices referred to as digital signal processors (DSP). This does not mean that the FIR can operate only on digital signals, however. A "digital signal" is a signal that conveys a discrete number of values. Contrast the "analog signal," i.e., a signal that conveys an infinite number of values. A signal having a digital form may be generated from an analog signal through sampling and quantizing the analog signal. Sampling an analog signal refers to "chopping" the signal into discrete time periods and capturing an amplitude value from the signal in selected ones of those periods. The captured value becomes the value of the digital signal during that sample period. Such a captured value is typically referred to as a sample. Quantizing refers to approximating a sample with a value that may be represented on a like digital signal. For example, a sample may lie between two values characterized upon the digital signal. The value nearest (in absolute value) to the sample may be used to represent the sample. Alternatively, the sample may be represented by the lower of the two values between which the sample lies. After quantization, a sample from an analog signal may be conveyed as a digital signal. This is the resultant signal upon which the FIR filter may operate.

Generally speaking, a DSP transforms an input digital signal to an output digital signal. For the FIR filter, the transformation involves filtering out undesired portions of the received digital signal. An original analog signal may be represented as a sum of a plurality of sinusoidal signals. Each sinusoidal signal oscillates at a particular and unique frequency. Filtering is used to remove certain frequencies from an input signal while leaving other frequencies intact.

A FIR filter is a device in which an input sample produces a finite number of output samples. After the finite number of samples expires, the FIR filter output is no longer affected by that particular input sample. Transversal filters, of which FIR filters may be a class, are filters in which a certain number of past samples are used along with the current sample to create each output sample.

FIR filters typically employ an instruction set and hardware design for programming of desired signal filtering. A program is a list of instructions which, when executed, performs a particular operation (i. e., a signal transformation). Programs executing on FIR filters often do so in "real-time". Real-time programs are programs that must execute within a certain time interval. Regardless of whether a program executes in a large period of time or a small period of time, the result of executing the program is the same. However, if real-time programs attempt to execute in an amount of time longer than the required time interval, then they no longer will compute the same result. Programs executing on a FIR filter are real-time programs in that the instructions are manipulating a sample of a digital signal during the interval preceding the receipt of the next sample. If the program cannot complete manipulating a sample before the next sample is provided, then the program will eventually begin to "lose" samples. A lost sample does not get processed, and therefore the output signal of the FIR filter no longer contains all of the information from the input signal provided to the FIR filter.

A FIR filter may be programmed to modify signals. The number of instructions required to do this is relatively fixed. A FIR filter must be capable of executing this relatively fixed number of instructions on any given sample before the next sample of the series is provided.

Besides considering a FIR filter's throughput, all design parameters are associated with a cost. One important cost factor is the silicon area needed to manufacture the FIR filter. Those which are manufactured on a relatively small silicon die are typically less expensive than those requiring a large silicon die. Therefore, an easily manufacturable, low cost FIR filter is desirable.

FIR filters often include memory devices, such as registers, ROM or RAM, to store instructions and samples. It is typical that more transistors are used to form the memory devices than those used to form other FIR filter circuitry. Sometimes the memory-to-other transistor ratio can exceed 2:1. Therefore, it is also important to minimize the size of the included memory devices. However, the size and location of the memory device directly affects throughput. Memory devices configured on the same silicon substrate as the FIR filter may be accessed significantly faster than memories configured on separate substrates. Therefore, large memory devices configured on the same silicon substrate as the FIR filter are desired.

Die area may be maintained while increasing the effective size of the instruction memory by decreasing the size of individual instructions. One method of decreasing the size of an instruction is to encode the information in as few bits as possible. Unfortunately, these instructions require complicated decoding circuitry to determine which of the instructions is currently being executed. Such decoding circuitry also may require a large silicon area or a large amount of time to execute, or both. A cost-effective, high performance instruction set solution is therefore needed to enhance existing FIR filters.

Some features of FIR filters that are important to the design engineer include phase characteristics, stability (although FIR filters are inherently stable), and coefficient quantization effects. To be addressed by the designer are concerns dealing with finite word length and filter performance. When compared with other filter options such as infinite impulse response (IIR) filters, only FIR filters have the capability of providing a linear phase response and are inherently stable, i.e., the output of a FIR filter is a weighted finite sum of previous inputs. Additionally, the FIR filter uses a much lower order than a generic Nyquist filter to implement the required shape factor. This carries a penalty of non-zero inter-symbol interference (ISI), however.

Coefficient quantization error occurs as a result of the need to approximate the ideal coefficient for the "finite precision" processors used in real systems. The net result due to approximated coefficients is a deviation from ideal in the frequency response.

Quantization error sources due to finite word length include:

a) input/output (I/O) quantization, b) filter coefficient quantization, c) uncorrelated roundoff (truncation) noise, d) correlated roundoff (truncation) noise, and e) dynamic range constraints.

Input noise associated with the analog-to-digital (A/D) conversion of continuous time input signals to discrete digital form and output noise associated with digital-to-analog conversion are inevitable in digital filters. Propagation of this noise is not inevitable, however.

Uncorrelated roundoff errors most often occur as a result of multiplication errors. For example, in attempting to maintain accuracy for signals that are multiplied, only a finite length can be stored and the remainder is truncated, resulting in "multiplication" noise being propagated. Obviously, any method that minimizes the number of multiplication steps will also reduce noise and increase inherent accuracy.

Correlated roundoff noise occurs when the products formed within a digital filter are truncated. These include the class of "overflow oscillations". Overflows are caused by additions resulting in large amplitude oscillations. Correlated roundoff also causes "limit-cycle effect" or small-amplitude oscillations. For systems with adequate coefficient word length and dynamic range, this latter problem is negligible. However, both overflow and limit-cycle effects force the digital filter into non-linear operation.

Constraints to dynamic range, such as scaling parameters, are used to prevent overflows and underflows of finite word length registers. For a FIR filter, an overflow of the output produces an error. If the input has a maximum amplitude of unity, then worst case output is:

$$y(n) = \sum_{n=0}^{N-1} x(n) = s \quad (1)$$

Where:

s=scaling factor x(n)=input y(n)=output

Guaranteeing y(n) is a fraction means that either the filter's gain or the input has to be scaled down by "s". Reducing gain implies scaling the filter coefficients to the point where a 16-bit coefficient, for example, would no longer be used efficiently. Another result of this scaling is to degrade frequency response due to high quantization errors. A better alternative is to scale the input signal. Although this results in a reduction in signal-to-noise ratio (SNR), the scaling factor used is normally <2, which does not change the SNR drastically.

A typical example of a high-speed FIR with five or more coefficients is a Type II FIR. A Type II FIR is based on an array of costly Multiply and Add (MAC) accumulation stages. A conventional system using MAC is constrained to a minimum number of gates to achieve a given partial product accuracy. Digital implementation of an FIR filter is also limited by the maximum number of logic gates that can be inserted between reclocking stages established by the filter's clock cycle. Thus, for a given digital process, a minimum time to process is established by the propagation time through the critical path. To achieve very high speeds of processing, the critical path is filtered and broken into a number of shorter paths that can be addressed at higher clock speeds, i.e., processed within a short clock cycle.

Some conventional high-speed systems employing FIR filters use an analog FIR filter placed before an analog-to-digital (A/D) converter. This prevents the FIR filter's latency from accumulating in the sampled timing recovery loop. This method is inherently not well suited to digitally intensive designs.

Some existing designs always include the FIR filter in the timing recovery loop, increasing latency ab initio, and decreasing stability of the embedded loops, both the timing recovery and gain loops, for example.

Other designs bypass the FIR filter during acquisition but require the coefficients of the FIR filter to be symmetric in order to avoid a phase hit when switching back the FIR filter at the end of the acquisition period.

In magneto-resistive (MR) heads using FIR filters, with their inherent response nonlinearities, this constraint is becoming even more unacceptable. There are more modern methods that achieve a fully digital solution, such as Cirrus Logic's proprietary Interpolated Timing Recovery, but these are extremely complex while covering a disproportionately large area on a silicon chip, for example. In one design, discrete time analog values are entered in memory as are weights, some of which are set to zero to improve throughput, and do not pass through delay lines.

There have been several novel approaches to achieving performance improvement of FIR filters. One involves converting a digital signal to log values, thus avoiding the use of multipliers.

A second more traditional technique uses oversampling.

Yet another approach uses variations of multiplexing, i.e., a multiplexed data stream is input to a tapped delay line and the filter provides a multiplexed output of alternated samples.

For those data streams that have a high dynamic range, a method involving splitting the sampled input signal into two portions and addressing each separately in separate filters has been proposed. Of course, this doubles the number of operations and the hardware required.

To reduce hardware complexity and computational intensity for relatively low-speed applications, such as modems, cascaded arrangements of data registers receive digitally encoded data and sequentially clock the samples. Each data register has a data capacity >2 the code width of a digitized sample, permitting each channel to store both I and Q data. Because the data capacity need be >2 the input, the data rate of devices with which this can be used is relatively low.

Some of the above introduce additional complexity not required in the preferred embodiments of the present invention while others may not be suitable for high-speed applications.

The most straightforward digital FIR filters use the "signed 2's complement" numbering system. This numbering system is noted for its simplicity, and is more than adequate for low-speed FIR filters such as might be used for modems and the like. Other digital FIR filters use a Radix-4 numbering system, which, although offering some improvement, does not fully exploit a 6-bit binary data format. Finally, some architectures have used Radix-8 numbering for the sole purpose of encoding coefficients.

SUMMARY

The present invention provides a fast FIR filter, as well as a system and method for increasing the speed of operation of FIR filters, for example, those that operate on unequalized n-bit binary input data, where n>2. In a preferred embodiment, this is accomplished by adopting the Radix-8 numbering system for encoding input data, combined with further encoding the data in "hot-one" mode. Two buses are provided. High order first 4 bit data are encoded on the first bus and low order last 3 bit data on the second. The buses are connected to all taps of the FIR filter.

Some of the salient advantages of the present invention are that it:

reduces the throughput time.

reduce the throughput "noise" by eliminating multiplication steps.

improves the choice of available multiplier circuitry.

reduces the number of operations for pre-multiplication to four.

avoids re-calculation at high speeds because coefficients do not change value at high data rates.

allows the use of a low-propagation-delay passgate multiplexer since data are further encoded in "hot one" mode.

DETAILED DESCRIPTION OF THE PREFERRED EMBODIMENTS

Figure 1:
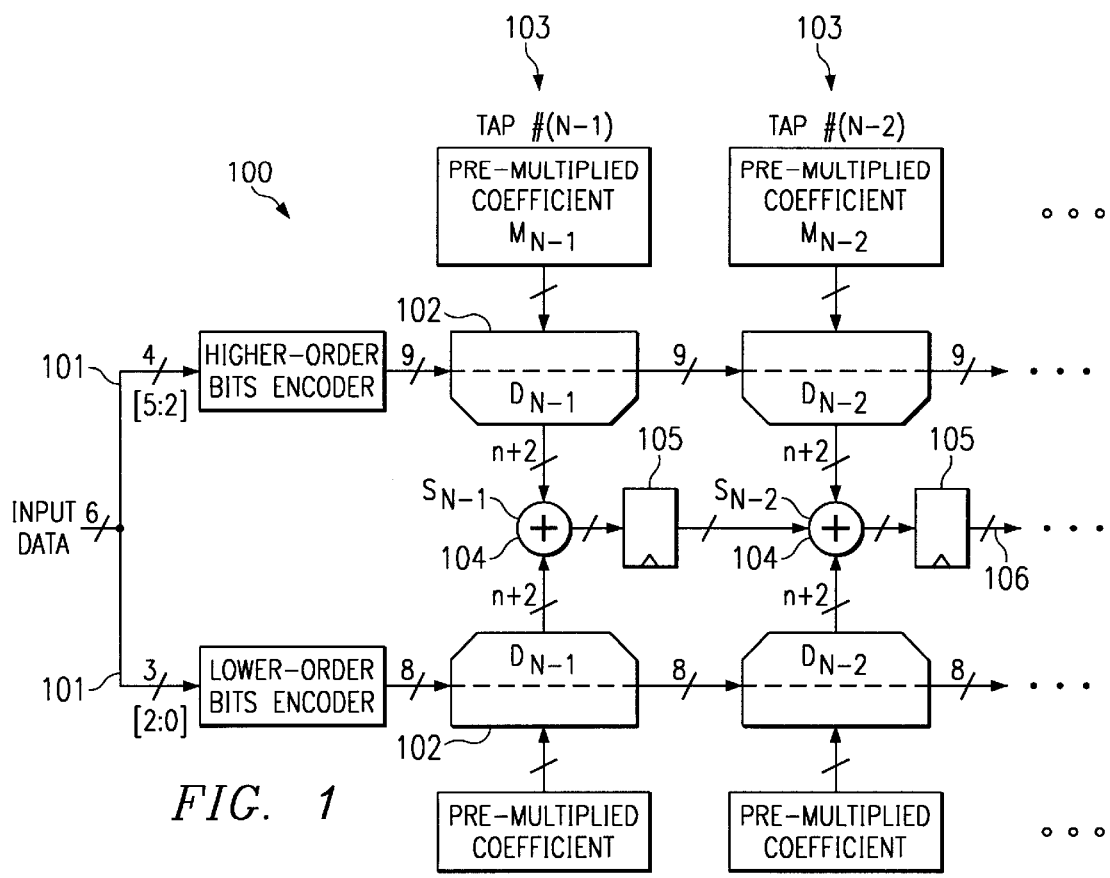
FIG. 1 is a block diagram of connections for a preferred embodiment.

The class of FIR filters with m coefficients fulfills the relation:

$$Y(n) = \sum_{j=1}^{m} C(j) * (n-j) \quad (2)$$

Where:

C(j)=coefficient of the filter with X(t) as an input sample and Y(t) as an output sample Y(n)=sum of the products over the interval j=1 . . . m j=the index Of course, a serial implementation of the above relation implies that for every output sample it is necessary to perform, in sequence, m products and m sums. Mathematically, this is the product of a vector, or row, consisting of the m coefficients of the filter and a vector, or column, consisting of the m consecutive input samples. In turn, this requires the provision of a clock signal having a period at least m times as small as that of the sample size. Both the coefficients and the samples are stored in registers, so that for each output sample, m additional addresses and m additional memory inputs are necessary.

A preferred embodiment of the present invention's FIR architecture specifically pertains to a system in which the unequalized quantized input data (for example, from an A/D converter) is of a 6-bit binary format. A particular embodiment is used in a high-speed magnetic recording Read Channel system.

A typical configuration of a high-speed FIR filter with five or more coefficients is of Type II, which is based on an array of Multiply and Add (MAC) accumulation stages. A preferred embodiment of the present invention exploits the system properties and eliminates a very costly multiply operation, replacing it with a simple add operation.

A preferred embodiment of the present invention's architecture encodes incoming high-speed 6-bit data into a Radix-8 numbering system. The physical format of the encoded data is contained on two buses as in FIG. 1. The first bus is a collection of 9 wires, i.e., 9-bit wide, representing a function of the high-order 4 bits of original input data. The second bus has eight wires, i.e., 8-bit wide, representing a function of the low-order 3 bits of original input data. One bit is shared between the two encoded numbers on the buses, hence a redundant arithmetic system is provided. The bits within each bus are further encoded in a "hot-one" manner, meaning that at all times exactly one bit is asserted. Individual delay elements of each bus have a connection to a corresponding tap of the FIR filter.

Each FIR coefficient is pre-multiplied for the following cases: −4C, −3C, −2C, −C, 0C, C, 2C, 3C, 4C, where "C" is the coefficient value. The "0C" (zero) pre-multiplication is very trivial. The power-of-two cases are also trivial: "2C" and "4C" values are simply left shifted by one and two bits, respectively. Similarly "−2C" and "−4C" cases are a simple left shift operation of the pre-negated "−C" coefficient. As a result, only "C," the negation, "−C"" and multiplication-by-three, "3C" and "−3C," non-trivial operations are required. A preferred embodiment of the present invention's architecture also capitalizes on the FIR coefficients not changing value at high data rates, eliminating high-speed coefficient pre-calculation.

A preferred embodiment of the present invention also provides a "hot-one" property for each bus. This property permits use of a simple low- propagational-delay pass-gate multiplexer structure to select pre-multiplied coefficients.

Referring to FIG. 1, a preferred embodiment of the FIR filter 100 includes a common N-tap delay line 101 provided in a parallel arrangement, each half having N−1 series-connected delay elements $D_{N-1}$ through $D_N$ 102. The top half has 9 wires for handling the high-order 4-bit input and the bottom has 8 wires for handling the low-order 3-bit input of the 6-bit quantized input signal. The N taps 103 connected to the parallel delay elements $D_{N-1}$ through $D_N$ 102 are further connected to a set of N summers $S_{N-1}$ through $S_N$ 104, each in turn connected to an accumulator $A_{N-1}$ to $A_N$ 105. The output is provided as a sum of the filtered data 106 from the two buses.

Figure 2:
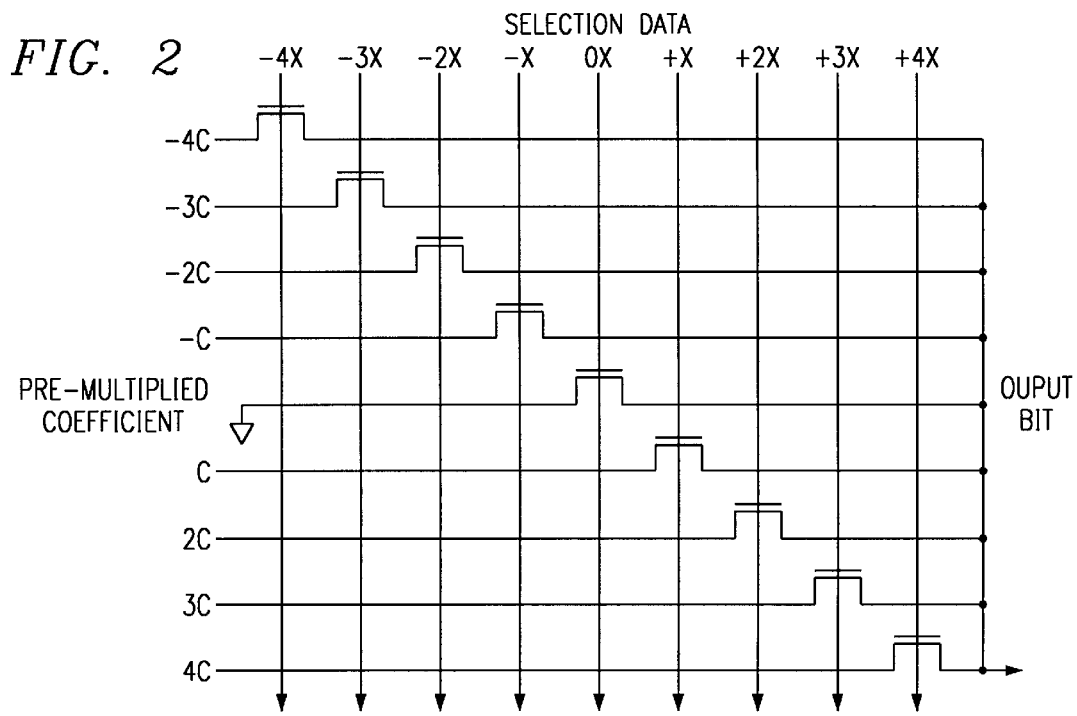
FIG. 2 depicts a simplified process using pre-multiplied coefficients.
Figure 3:
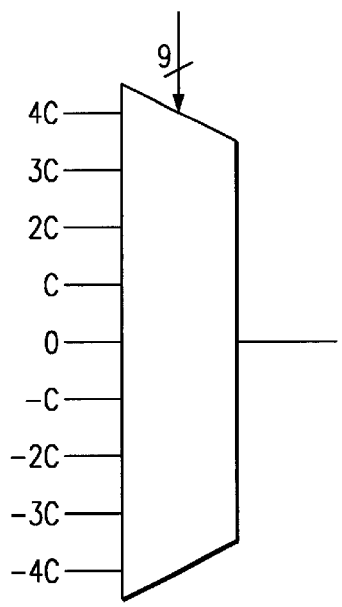
FIG. 3 symbolically represents coefficients input to a 9-wire delay line.
Figure 4:
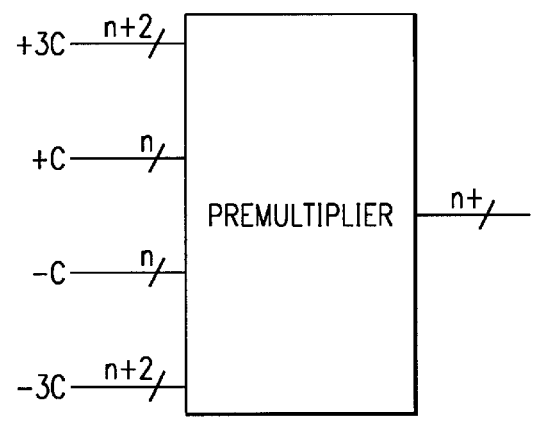
FIG. 4 represents the non-trivial, or essential, coefficients.
Figure 5:
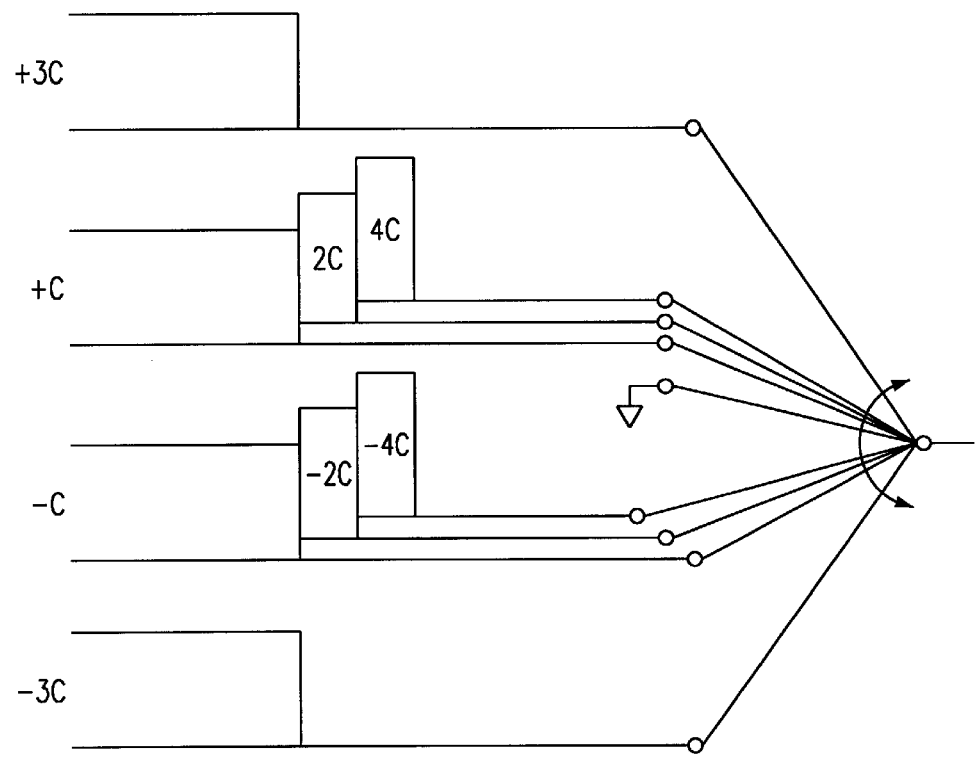
FIG. 5 represents the process of adding non-trivial to trivial coefficients.

FIG. 2 depicts how the pre-multiplied coefficients are applied to data and provided as output. FIG. 3 is a symbolic representation of all nine coefficients, the trivial and the essential, as input to a 9-wire bus. FIG. 4 shows only the essential, i.e., non-trivial, coefficients presented as inputs. FIG. 5 depicts the "re-coding" of the coefficients once considering the trivial nature of a subset of the coefficients. By operating on a limited number of coefficients, the gain in computational power is not matched with a concomitant increase in number of operations and hardware components.

The foregoing describes the salient features of the present invention's modified architecture, system, and method, and should not be interpreted as limiting the application of, method of operation, or uses for the present invention to that specified in the foregoing. While the invention has been shown with specific components and circuits, and further described with regard to specific coefficient pre-multiplier circuits, summers and accumulators, it will be understood by those skilled in the art that various other changes in the selection of components and use with different combinations of circuit components, or other details may be changed without departing from the spirit and scope of the invention.

I claim:

1. A system for increasing the speed of a FIR filter, the filter having taps and an architecture for encoding an input signal, the system comprising:

a high order numbering system, Radix-N,
wherein, N>2;

coefficients associated with the taps,
wherein a subset of said coefficients are pre-multiplied;

first and second buses each conveying an applicable part of the input signal;

a bit encoder to encode said applicable parts;

subsystems functionally connected to said buses, for filtering said input signal, and a multiplier circuit for selecting said subset of pre-multiplied coefficients.

2. The system of claim 1 wherein said applicable part on said first bus contains high order bit streams and said applicable part on said second bus contains low order bit streams.

3. The system of claim 2 wherein said high order bit stream is the first 4 bits of said Radix-8 system and said low order bit stream is the last 3 bits of said Radix-8 system, wherein said high order numbering system is Radix-8.

4. The system of claim 1 wherein said subset of pre-multiplied coefficients are those that are non-trivial, wherein that subset that is trivial is subjected to a shift-and-add operation rather than a multiply operation.

5. The system of claim 1 wherein said multiplier circuit is a low-propagational-delay passgate multiplexer.

6. A method for increasing the operating speed of a FIR filter, having an architecture and taps associated with coefficients, $C_N$, the method comprising:

implementing a high order numbering system, Radix-N, in the architecture;

inserting applicable parts of an incoming signal on parallel buses;

encoding said applicable parts into said Radix-N;

premultiplying a subclass of coefficients within a class of coefficients, $C_N$;

wherein said class of coefficients, $C_N$, comprises trivial and non-trivial coefficients and, wherein said trivial coefficients are subjected to a shift-and-add operation and said non-trivial coefficients are subjected to a multiply operation;

inputting a coefficient, $C_N$, to a delay line having an output, said delay line located on said buses; and summing pairs of said delay line outputs and accumulating said sums as a filtered output.

7. The method of claim 6 whereby a first bus is used for the high order first 4 bits of the high order numbering system and a second bus is used for the low order last 3 bits of the high order numbering system, wherein, Radix-8 is the high order numbering system and the input signal is 6-bit data.

8. The method of claim 6 further encoding said data in "hot-one" mode.

9. The method of claim 6 wherein the coefficients, $C_N$, are pre-multiplied only in non-trivial cases, said non-trivial cases being: C, –C, 3C, and –3C.

10. An architecture for a FIR filter, the filter having taps and an architecture for encoding an input signal, the architecture comprising:

a high order numbering system, Radix-N,
wherein, N>2;

coefficients associated with the taps,
wherein a subset of said coefficients are pre-multiplied;

first and second buses each conveying an applicable part of the input signal;

a bit encoder to encode said applicable parts;

subsystems functionally connected to said buses, for filtering said input signal, and multiplier circuit for selecting said subset of pre-multiplied coefficients.

11. The system of claim 10 wherein said applicable part on said first bus contains high order bit streams and said applicable part on said second bus contains low order bit streams.

12. The system of claim 11 wherein said high order bit stream is the first 4 bits of said Radix-8 system and said low order bit stream is the last 3 bits of said Radix-8 system, wherein said high order numbering system is Radix-8.

13. The system of claim 10 wherein said subset of pre-multiplied coefficients are those that are non-trivial, wherein that subset that is trivial is subjected to a shift-and-add operation rather than a multiply operation.

14. The architecture of claim 10 wherein said multiplier circuit is a low-propagational-delay passgate multiplexer.

15. A method for processing an input signal with a FIR filter, having an architecture and taps associated with coefficients, $C_N$, the method comprising:

implementing a high order numbering system, Radix-N, in the architecture;

inserting applicable parts of an incoming signal on parallel buses;

encoding said applicable parts into said Radix-N system;

premultiplying a subclass of coefficients within a class of coefficients, $C_N$;

wherein said class of coefficients, $C_N$, comprises trivial and non-trivial coefficients and, wherein said trivial coefficients are subjected to a shift-and-add operation and said non-trivial coefficients are subjected to a multiply operation;

inputting a coefficient, $C_N$, to a delay line having an output, said delay line located on said buses; and summing pairs of said delay line outputs and accumulating said sums as a filtered output.

16. The method of claim 15 wherein a first bus is used for a high order first 4 bits and a second bus is used for a low order last 3 bits, wherein, Radix-8 is used as the high order numbering system.

17. The method of claim 15 wherein coefficients are pre-multiplied only for non-trivial cases: C, –C, 3C, and –3C.

18. A FIR filter having taps, an architecture for encoding an input signal, and a functionally connected system for increasing throughput speed, the system comprising:

a high order numbering system, Radix-N,
wherein, N>2;

coefficients associated with the taps,
wherein a subset of said coefficients are pre-multiplied;

first and second buses each conveying an applicable part of the input signal;

a bit encoder to encode said applicable parts;

subsystems functionally connected to said buses, for filtering said input signal, and a multiplier circuit for selecting said subset of pre-multiplied coefficients.

19. The FIR filter of claim 18 wherein said applicable part on said first bus contains high order bit streams and said applicable part on said second bus contains low order bit streams.

20. The FIR filter of claim 19 wherein said high order bit stream is the first 4 bits of said Radix-8 system and said low order bit stream is the last 3 bits of said Radix-8 system, wherein said high order numbering system is Radix-8.

21. The FIR filter of claim 18 wherein said subset of pre-multiplied coefficients are those that are non-trivial, and wherein that subset that is trivial is subjected to a shift-and-add operation rather than a multiply operation.

22. The FIR filter of claim 18 wherein said multiplier circuit is a low-propagational-delay passgate multiplexer.

* * * * *